US012293335B2

(12) United States Patent
Massa

(10) Patent No.: US 12,293,335 B2
(45) Date of Patent: May 6, 2025

(54) SYSTEM AND METHOD OF AUTOMATING THE RECRUITMENT PROCESS BETWEEN EMPLOYMENT CANDIDATES AND RECRUITING ENTITIES

(71) Applicant: Christina Massa, Franklin Square, NY (US)

(72) Inventor: Christina Massa, Franklin Square, NY (US)

(*) Notice: Subject to any disclaimer, the term of this patent is extended or adjusted under 35 U.S.C. 154(b) by 0 days.

(21) Appl. No.: 18/584,596

(22) Filed: Feb. 22, 2024

(65) Prior Publication Data
US 2024/0370831 A1 Nov. 7, 2024

Related U.S. Application Data

(60) Provisional application No. 63/464,079, filed on May 4, 2023.

(51) Int. Cl.
G06Q 10/1053 (2023.01)
(52) U.S. Cl.
CPC .............................. G06Q 10/1053 (2013.01)
(58) Field of Classification Search
CPC .................................................. G06Q 10/1053
See application file for complete search history.

(56) References Cited

U.S. PATENT DOCUMENTS

2017/0147984 A1* 5/2017 Zoia ..................... G06F 16/9535
2017/0180294 A1* 6/2017 Milligan ............... H04L 51/216
2019/0114593 A1* 4/2019 Champaneria ...... G06F 16/3326
2020/0175394 A1* 6/2020 Gee ......................... G06N 5/04
2020/0184422 A1* 6/2020 Mondal ............. G06Q 10/1053
(Continued)

FOREIGN PATENT DOCUMENTS

WO WO-2010077989 A1 * 7/2010 ......... G06Q 10/1053

OTHER PUBLICATIONS

Shaikh, Zaffar Ahmed, et al. "Blockchain hyperledger with non-linear machine learning: A novel and secure educational accreditation registration and distributed ledger preservation architecture." Applied Sciences 12.5 (2022): 2534. (Year: 2022).*

Primary Examiner — Brendan S O'Shea
(74) Attorney, Agent, or Firm — Shore IP Group, PLLC; Sean R. Wilsusen

(57) ABSTRACT

A method of performing automated job recruitment includes receiving a plurality of recruitment listings, each including data indicative of job qualifications. The method includes compiling a body of knowledge based on the recruitment listings, and receiving a job application from a candidate, which includes a resume and a target recruitment listing. The method includes extracting relevant data from the resume and providing the job application to a hiring entity corresponding to the target recruitment listing. Upon providing the job application to the hiring entity, the method includes providing the candidate with an automated status update response indicating that the candidate is being considered for the target recruitment listing. The method includes receiving an acceptance/rejection communication from the hiring entity, indicating whether the candidate has been accepted or rejected for the target recruitment listing, and providing another automated response to the candidate indicating whether the candidate has been accepted or rejected.

18 Claims, 6 Drawing Sheets

(56) References Cited

U.S. PATENT DOCUMENTS

| | | | | |
|---|---|---|---|---|
| 2020/0202304 A1* | 6/2020 | Maltese | ............. | G06Q 10/1053 |
| 2020/0272994 A1* | 8/2020 | Silveira | ................. | G06N 20/20 |
| 2020/0402014 A1* | 12/2020 | Jena | ...................... | G06N 5/046 |
| 2021/0312401 A1* | 10/2021 | McHale | ............. | G06Q 10/1053 |
| 2021/0357458 A1* | 11/2021 | Wu | ..................... | G06F 16/9038 |

* cited by examiner

FIG. 2

Dear <first name>:

I hope this message finds you well.

I am writing to you today to express my sincere gratitude for your interest in <job title> position at <company>. I was very impressed with application, and I am excited to have the opportunity to <if first response> review your application <eligible for first interview> offer you a job screening conversation. I am free to discuss <mm/dd/yy at hh:mm> Note: a click to an online calendar would be better!)

<if no interview, but still being considered>, I realize that the waiting is not great, but you are still being considered. Hang in there, we are doing our best to move the process along. Keep smiling. Keep moving.

<if rejection after 1 or 2 rounds> It was a pleasure connecting with you today. Interviewing is never an easy experience, <if candidate was charismatic> but your engagement was enlightening. If you would like to be instantly referred to our pooled network of partners in the Recruiter Scooter cloud <list disclosures for legal coverage>, click <HERE>

Here are some links you may find useful in your job search journey.

<SS&C Partner Wellsky>

<SS&C Partner CVS>

<links to other sites>

In addition to these referrals, we have resources that you can utilize to help strengthen your search:
You may be surprised how your skills are transportable should you want to broaden your horizons <attach skills mapping matrix>.

SYSTEM AND METHOD OF AUTOMATING THE RECRUITMENT PROCESS BETWEEN EMPLOYMENT CANDIDATES AND RECRUITING ENTITIES

CROSS-REFERENCE TO RELATED APPLICATION

The present non-provisional patent application claim priority to U.S. Provisional Patent Application No. 63/464,079 filed on May 4, 2023, the entire contents of which are incorporated by reference herein.

FIELD

The present disclosure relates to a system and method of automating the recruitment process between employment candidates and recruiting organizations.

BACKGROUND

Employment candidates often utilize recruiting organizations when searching for employment. Such recruiting organizations may match an employment candidate with a potential employer based on the candidate's skills and interests. Often, recruiting organizations do not provide timely responses to employment candidates. This lack of communication may result in uncertainty and anxiety for the employment candidate, as the candidate may be left questioning his/her candidacy and feeling insecure about his/her job search progress. This may lead to feelings of stress, anxiety, and decreased motivation, as well as the candidate being left feeling undervalued and disrespected.

SUMMARY

The present disclosure describes various uses of a resume. The resume may be interchangeably referred to and understood as a common application. The common application provides information for an applicant that is suitable for job placement, apartment/house/vacation rental, dating applications, pet sitting positions, pet adoption, volunteer positions, coaching positions, childcare positions, elder care positions, tutoring positions, academic positions, and the like. The common application provides a user with a pre-populated set of information that can be easily transmitted, as described herein in more detail to rapidly facilitate an application process, such as an application for a job. For example, contact information, employment history, licenses, academic credentials, references, writing or publication samples, etc. may all be included in the common application.

The common application may work in conjunction with an embedded background check. That is, an applicant generating a common application can also opt to have a background check conducted preemptively, and the results of the background check can be stored and provided in embedded format with the common application. Thus, the common application and/or background check can be made readily available for dissemination by a user to rapidly maneuver through an employment process that might take a considerable amount of time under conventional circumstances. For example, a decision to hire someone or approve an applicant for any of the positions or arrangements (e.g., property rentals) described herein may be completed substantially instantaneously, such as in real-time.

Provided in accordance with aspects of the present disclosure is a system of performing automated job recruitment. The system includes an AI-driven job recruitment system in communication with a machine learning model. The machine learning model is configured to receive a plurality of recruitment listings. Each recruitment listing includes data indicative of job qualifications. The machine learning model is further configured to compile a body of knowledge based on the received recruitment listings and receive a job application from a candidate. The job application includes a resume and a target recruitment listing among the plurality of recruitment listings. The machine learning model is further configured to extract relevant data from the resume by analyzing the resume, provide the job application to a hiring entity corresponding to the target recruitment listing, and upon providing the job application to the hiring entity, provide the candidate with an automated status update response, indicating to the candidate that the candidate is being considered for the target recruitment listing. The machine learning model is further configured to receive an acceptance/rejection communication from the hiring entity, indicating whether the candidate has been accepted or rejected for the target recruitment listing. When the acceptance/rejection communication indicates that the candidate has been accepted for the target recruitment listing, the machine learning model is further configured to provide the candidate with an automated acceptance update response, indicating to the candidate that the candidate has been accepted for the target recruitment listing. When the acceptance/rejection communication indicates that the candidate has been rejected for the target recruitment listing, the machine learning model is further configured to provide the candidate with an automated rejection update response, indicating to the candidate that the candidate has been rejected for the target recruitment listing.

In an aspect of the present disclosure, when the acceptance/rejection communication indicates that the candidate has been rejected for the target recruitment listing, the machine learning model is further configured to compare the extracted relevant data from the resume with each recruitment listing in the body of knowledge other than the target recruitment listing, and determine whether the candidate is a match with any one of the recruitment listings in the body of knowledge other than the target recruitment listing. When it is determined that the candidate is a match with any one of the recruitment listings in the body of knowledge other than the target recruitment listing, the machine learning model is further configured to provide the candidate with an automated matching update response, including information related to the matching recruitment listing. When it is determined that the candidate is not a match with any one of the recruitment listings in the body of knowledge other than the target recruitment listing, the machine learning model is further configured to provide the candidate with an automated non-matching update response, indicating to the candidate that a match was not found.

In an aspect of the present disclosure, the automated non-matching update response includes career coaching information.

In an aspect of the present disclosure, the career coaching information includes a matrix template mapping skills of the user included in the relevant data extracted from the resume with qualifications for a bridge job.

In an aspect of the present disclosure, the automated status update response is a personalized empathetic response generated based on the extracted relevant data.

In an aspect of the present disclosure, the automated status update response is personalized based on a birthdate of the user.

In an aspect of the present disclosure, the automated status update response is one of a plurality of automated status update responses, and the user chooses the frequency of receiving the plurality of automated status update responses.

In an aspect of the present disclosure, the machine learning model is further configured to establish a connection with a communication portal of an unemployment agency and transmit employment data corresponding to the candidate to the unemployment agency.

In an aspect of the present disclosure, the employment data includes job search data indicating a job search status corresponding to the candidate.

In an aspect of the present disclosure, the employment data includes an employment status corresponding to the candidate.

Provided in accordance with aspects of the present disclosure is a computer-implemented method of performing automated job recruitment. The method includes receiving a plurality of recruitment listings. Each recruitment listing includes data indicative of job qualifications. The method further includes compiling a body of knowledge based on the received recruitment listings and receiving a job application from a candidate. The job application includes a resume and a target recruitment listing among the plurality of recruitment listings. The method further includes extracting relevant data from the resume by analyzing the resume and providing the job application to a hiring entity corresponding to the target recruitment listing. Upon providing the job application to the hiring entity, providing the candidate with an automated status update response, the method further includes indicating to the candidate that the candidate is being considered for the target recruitment listing. The method further includes receiving an acceptance/rejection communication from the hiring entity, indicating whether the candidate has been accepted or rejected for the target recruitment listing. When the acceptance/rejection communication indicates that the candidate has been accepted for the target recruitment listing, the method further includes providing the candidate with an automated acceptance update response, indicating to the candidate that the candidate has been accepted for the target recruitment listing. When the acceptance/rejection communication indicates that the candidate has been rejected for the target recruitment listing, the method further includes providing the candidate with an automated rejection update response, indicating to the candidate that the candidate has been rejected for the target recruitment listing.

In an aspect of the present disclosure, when the acceptance/rejection communication indicates that the candidate has been rejected for the target recruitment listing, the method further includes comparing the extracted relevant data from the resume with each recruitment listing in the body of knowledge other than the target recruitment listing, and determining whether the candidate is a match with any one of the recruitment listings in the body of knowledge other than the target recruitment listing. When it is determined that the candidate is a match with any one of the recruitment listings in the body of knowledge other than the target recruitment listing, the method further includes providing the candidate with an automated matching update response, including information related to the matching recruitment listing. When it is determined that the candidate is not a match with any one of the recruitment listings in the body of knowledge other than the target recruitment listing, the method further includes providing the candidate with an automated non-matching update response, indicating to the candidate that a match was not found.

In an aspect of the present disclosure, the automated non-matching update response includes career coaching information.

In an aspect of the present disclosure, the career coaching information includes a matrix template mapping skills of the user included in the relevant data extracted from the resume with qualifications for a bridge job.

In an aspect of the present disclosure, the automated status update response is a personalized empathetic response generated based on the extracted relevant data.

In an aspect of the present disclosure, the automated status update response is personalized based on a birthdate of the user.

In an aspect of the present disclosure, the automated status update response is one of a plurality of automated status update responses, and the user chooses the frequency of receiving the plurality of automated status update responses.

In an aspect of the present disclosure, the method further includes establishing a connection with a communication portal of an unemployment agency and transmitting employment data corresponding to the candidate to the unemployment agency.

In an aspect of the present disclosure, the employment data includes job search data indicating a job search status corresponding to the candidate.

In an aspect of the present disclosure, the employment data includes an employment status corresponding to the candidate.

BRIEF DESCRIPTION OF THE DRAWINGS

Various aspects and features of the present disclosure are described hereinbelow with reference to the drawings, wherein:

FIG. 2 is an example of an automated message generated by a response generation module of a machine learning model of the AI system of FIG. 1;

DETAILED DESCRIPTION

Figure 1:
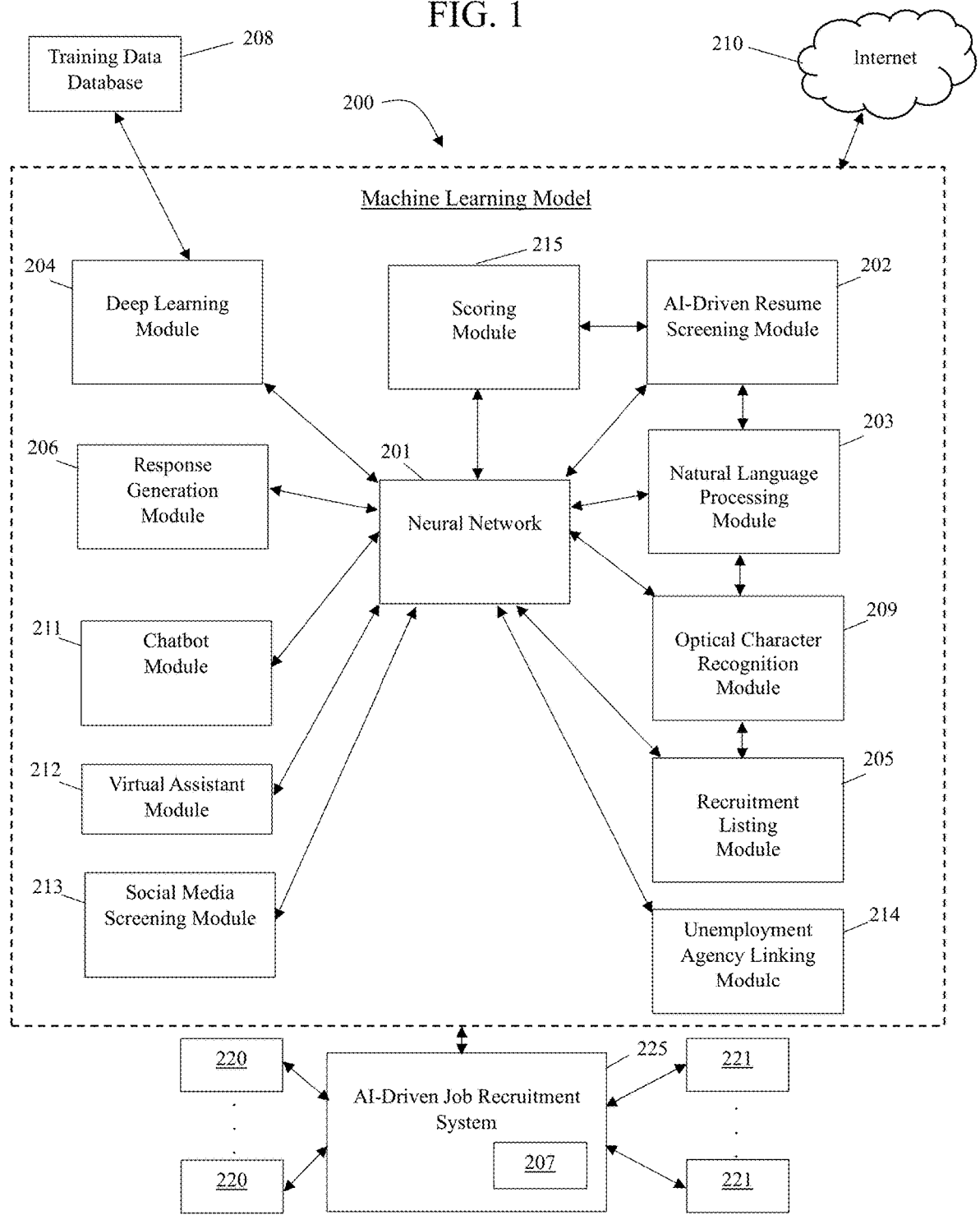
FIG. 1 is a schematic diagram of an artificial intelligence (AI) system employable by an automated AI-driven job recruiting system according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments unless the context clearly indicates otherwise.

As used herein, the singular forms "a," "an" and "the" are intended to include the plural forms as well, unless the context clearly indicates otherwise.

Exemplary configurations of the disclosure will be described more fully below (e.g., with reference to the accompanying drawings). Like reference numerals may refer to like elements throughout the specification and drawings.

An automated AI-driven job recruiting system according to aspects of the present disclosure employs artificial intelligence (AI) to automate the job recruitment process. The automated AI-driven job recruiting system according to aspects of the present disclosure employs AI to match job candidates (hereinafter also referred to as "candidates" or "users") with open positions/jobs (hereinafter also referred to as "recruitment listings") being offered by job hiring companies (hereinafter referred to as "hiring companies" or "hiring entities") in a manner that streamlines the process for both the candidates and the hiring entities. The automated AI-driven job recruiting system may increase efficiency and speed up the hiring process, may improve the experience of the candidate by providing faster, more personalized and engaging interactions, and may improve hiring decisions by using data-driven insights and mitigating potential biases.

The automated AI-driven job recruiting system may provide a number of benefits. For example, the automated AI-driven job recruiting system may keep a candidate engaged during the job application process, by providing periodic, positive and empathetic updates to the candidate while the candidate waits for an acceptance or rejection after applying for a job. The system can save time by quickly filtering out unqualified candidates, reduce unconscious bias by relying solely on pre-defined criteria, handle a large volume of applications, which in turn may result in the discovery of highly qualified candidates that may not otherwise have been discovered, reduce false positives and false negatives that may occur due to the overreliance on keywords resulting in missing qualified candidates in favor of less qualified candidates who are using carefully crafted keyword heavy resumes, and reduce bias which can lead to unfair discrimination.

Further, the automated AI-driven job recruiting system may improve the speed of the resume review process, reducing the amount of manual workload typically done by the hiring entity, allowing the hiring entity to focus on high-potential candidates. In addition, the automated AI-driven job recruiting system may reduce bias by eliminating unconscious bias factors such as, e.g., the candidate's name, the school(s) attended by the candidate, or irrelevant keywords, instead providing an emphasis on relevant skills and qualifications.

A robust body of knowledge may be created using, for example, information provided to an automated AI-driven job recruitment system by hiring entities and resumes provided to the system by candidates, as well as other available information including, e.g., information available via the Internet. For example, the body of knowledge may be created and updated based on information relating to hard skills and experience of candidates, and information relating to soft skills and personality of candidates.

Examples of information relating to hard skills and experience include detailed work experience such as, e.g., past projects, accomplishments, quantifiable results, and specific skills used, technical skills such as, e.g., programming languages, software proficiency, certifications, and technical expertise, and professional affiliations and memberships.

Examples of information relating to soft skills and personality include personality assessments such as, e.g., insights into communication style, teamwork, emotional intelligence, and work ethic, behavioral information such as, e.g., problem-solving abilities, critical thinking, and responses to specific scenarios, and work simulations and role-playing such as, e.g., assessing potential for handling real-world situations and collaborating with others.

The body of knowledge referred to herein may be used to perform the automated AI-driven recruitment process. The body of knowledge may refer to anything that an AI system can find or access.

In embodiments, the body of knowledge may be created based on recruitment listings received from hiring entities, and thus, may form a large repository of recruitment listings. For example, recruitment listings may be provided by hiring entities, and these recruitment listings may be analyzed and stored in the body of knowledge. Once stored, these recruitment listings may be referred to when performing a job search. For example, data extracted from resumes received by candidates may be compared to the robust body of knowledge to match a candidate with a recruitment listing included in the body of knowledge.

While the body of knowledge may be primarily based on data extracted from received recruitment listings, additional data may be used to improve the level of knowledge included in the body of knowledge. For example, the body of knowledge may include information acquired from live sources (e.g., live news broadcasts, current print articles, or current scientific publications or announcements) which can be accumulated and prepared for citation before being added to the body of knowledge.

The body of knowledge may include images (still or video images), or data derived from such images, or audio transmissions or recordings.

FIG. 1 provides an exemplary architecture of a machine learning model 200 that may be implemented according to embodiments of the present disclosure. The machine learning model 200 may include a neural network 201, which is described in more detail below. As an example, the machine learning model 200 may include the neural network 201 including or configured to communicate with a deep learning module 204, a response generation module 206, an AI-driven resume screening module 202, a natural language processing (NLP) module 203, an optical character recognition (OCR) module 209, a recruitment listing module 205, a chatbot module 211, a virtual assistant module 212, a social media screening module 213, and an unemployment agency linking module 214.

The deep learning module 204 may access training data, such as training data stored in a training data database 208. The training data database 208 can be continuously updated with new/expanded training data. Training an AI module, such as a deep learning model, is described in more detail below. The modules included in the machine learning model 200 may communicate with the Internet 210 to communicate data including, for example, receiving data employable in generating the body of knowledge. Updated information may be captured from the Internet 210 on a constant and instantaneous or near-instantaneous basis, such that the body of knowledge can always be maximally current and employed for use in matching candidates with recruitment listings (also referred to as job listings).

The neural network 201 may refer to the architectural core of the machine learning model 200. The neural network 201 may take a set of inputs, pass the inputs through a series of hidden layers, in which each layer can transform the inputs, and then produce an output. The process of transforming the input is determined by the weights and biases of the neurons in the hidden layers of the neural network 201, which are learned from data during training of the neural network (see, e.g., training data database 208). The neural network 201 may include relatively simple (single layer) or relatively complex structures (multiple layers). The deep learning module 204 may employ a particular type of neural network (e.g., a Convolutional Neural Network) to process data.

The deep learning module 204 may be employed by the neural network 201. The deep learning module 204 may deliver high-dimensional representations of user data (candidate data) to the neural network 201. The neural network 201 may then use the information from the deep learning module 204 to learn complex patterns and inform the neural network's decision-making processes. Additionally, the neural network 201 may help guide the AI-driven resume screening module 202 by helping to understand content corresponding to a candidate's resume(s) and a recruitment listing(s). The AI-driven resume screening module 202 may use the learned representations from the neural network 201 to better tailor matching between candidate resumes and recruitment listings. The neural network 201 may work with the natural language processing module 203 by generating language representations that the natural language processing module 203 may use for understanding and generating text.

The deep learning module 204 can be employed for generating embeddings and high-dimensional representations of user data (candidate data) and recruitment listing data. The deep learning module 204 can receive data inputs such as resumes from candidates and recruitment listings from hiring entities, which may include information listed above as being used to create the body of knowledge and transform these inputs into a representation of each candidate and each recruitment listing. The outputs from the deep learning module 204 can be employed by the other modules within the machine learning model 200 to match candidates to recruitment listings. Over the course of predictions and feedback, the deep learning module 204 can become more accurate in match making.

The AI-driven resume screening module 202 may receive and analyze a candidate's resume. Upon performing this analysis, the AI-driven resume screening module 202 may identify and extract relevant keywords and skills from the resume. The extracted keywords and skills may then be used to match the candidate with potential hiring entities that are searching for a candidate having a certain background, skillset, level of experience, etc. The AI-driven resume screening module 202 may utilize AI algorithms to perform this analysis to quickly identify candidates with the most relevant skills and experience for different recruitment listings, and match candidates with corresponding listings.

For example, the AI-driven resume screening module 202 may employ an AI algorithm to scan a resume to identify and extract general information such as, e.g., skills, experience, and education, as well as specific information such as, e.g., particular keywords defined by the hiring entity. The AI-driven resume screening module 202 may utilize the natural language processing module 203 and the optical character recognition module 209 to employ NLP and OCR to parse a resume to extract the general information and the specific information. OCR and NLP may also be used to perform structure analysis of the resume. For example, the layout and formatting of the resume may be analyzed to identify specific sections such as, e.g., a work history section, an education section, a skills section, etc. In embodiments, OCR and NLP may be utilized to understand the context of keywords and skills listed in a resume.

Information extracted from the resume may be matched against information included in a recruitment listing, such as, e.g., keywords and phrases, and a scoring module 215 in communication with the AI-driven resume screening module 202 may calculate and assign a score based on the frequency of matches between the information and the keywords extracted from the resume and phrases included in the recruitment listing. Candidates who score above a preset threshold may be flagged as being target candidates for a specific recruitment listing.

In embodiments, the score assigned may be divided into a plurality of subscores. For example, an overall score may be an aggregate of a plurality of subscores such as, e.g., a skill match subscore, an experience subscore, and an education subscore. The skill match subscore may be assigned based on the result of matching skills listed in the resume against required skills listed in the job description. A direct match may result in a higher score than a partial match. The experience subscore may be assigned by evaluating factors such as, for example, company reputation, job title similarity, project details, duration of time spent at previous jobs, etc., and comparing these factors against job requirements. The education subscore may be assigned by evaluating factors such as, for example, degrees, schools attended, majors of the candidate, etc., and comparing these factors against job requirements.

A weighted formula may be used to create the total score for a candidate. The weighted formula may vary based on requirements of different recruitment listings. For example, certain recruitment listings may place an emphasis on the skill match subscore relative to the experience subscore and the education subscore, while other recruitment listings may place an emphasis on the experience subscore relative to the skill match subscore and the education subscore.

A threshold value may be set for different recruitment listings, and resumes receiving a score below the corresponding threshold value may be automatically rejected. Remaining resumes receiving a score above the corresponding threshold may be ranked based on their scores, with the highest-scoring resumes being prioritized for further review (e.g., by a human).

In embodiments, the AI-driven resume screening module 202 may utilize sentiment analysis to identify factors such as, for example, enthusiasm, creativity, or specific personality traits within an analyzed resume. Sentiment analysis may analyze language used in the resume to assess the candidate's tone, enthusiasm, etc.

In embodiments, machine learning algorithms may be used to continuously learn and improve the accuracy of candidate ranking based on, e.g., historical hiring data and feedback.

The recruitment listing module 205 may receive and analyze a recruitment listing from a hiring entity. For example, the recruitment listing module 205 may utilize the natural language processing module 203 and the optical character recognition module 209 to employ NLP and OCR to identify and extract relevant information, including, e.g., keywords and phrases, from the recruitment listing. OCR and NLP may also be used to perform structure analysis of the recruitment listing, and to understand the context of keywords and listed in the recruitment listing. The extracted information may be used by the AI-driven resume screening module 202 when matching the candidate with potential hiring entities that are searching for a candidate having a certain background, skillset, level of experience, etc. For example, the recruitment listing module 205 may identify and extract relevant information and use this information to form the body of knowledge. The AI-driven resume screening module 202 may then extract data from candidate resumes, and this extracted data may be compared with data in the body of knowledge to match a candidate with a recruitment listing. By receiving and analyzing a plurality of recruitment listings from a plurality of participating hiring entities, the robust body of knowledge may be formed.

A response generation module 206 may use AI algorithms to generate responses to inquiries submitted by a candidate. The responses may be positive and empathetic responses, which can serve as a morale booster for a candidate as the candidate awaits further information regarding the recruitment process. For example, in an initial application process, upon a candidate submitting his/her resume, the response generation module 206 may provide a personalized response using information extracted from the resume. While the candidate is waiting for a final decision, periodic personalized updates regarding the job application status, such as, e.g., "We didn't forget you, we are still analyzing our prospects, hang in there," may be sent to the candidate, at a frequency chosen by the candidate. If an interview has been secured, a personalized message may be sent to the candidate. If it is immediately determined that a candidate is not a fit for an available recruitment listing, a message may be sent to the candidate including, e.g., career coaching links or a matrix template to map skills for a bridge job. For example, when the candidate cannot be matched with his/her target recruitment listing, or any other recruitment listings, an automated response may be provided to the candidate which includes job suggestions and/or skills that the candidate may consider acquiring (e.g., via further education, certifications, etc.) to increase the candidate's chance of being matched with a recruitment listing. The response generation module 206 may provide responses that are generically inclusive and lawful and can tailor generated responses to be agnostic and factual. An example of an automated message generated by the response generation module 206 and sent to a candidate is shown in FIG. 2.

A chatbot module 211 may be utilized to answer inquiries provided by the candidate. For example, a candidate may provide inquiries relating to, e.g., the company in search of a candidate, the role looking to be filled by the company, the application process pertaining to the role looking to be filled, etc.

According to embodiments, the chatbot module 211 may perform the initial screening process of a candidate by performing tasks such as, for example, greeting a candidate, providing the candidate with information relating to hiring entities and open positions, and collecting information (e.g., contact details, key skills, experience information, etc.) from the candidate. In embodiments, the chatbot module 211 may guide candidates to relevant recruitment listings by asking the candidate targeted questions about, e.g., interests, goals, and qualifications. In embodiments, the chatbot module 211 may streamline the initial screening process by asking the candidate questions about, e.g., required qualifications, certifications, availability, salary expectations, or previous work experiences. In embodiments, the chatbot module 211 may quickly answer frequently asked questions about, e.g., company culture, benefits, job descriptions, and application processes. The chatbot module 211 can promote equal opportunity and provide an inclusive recruitment process by using unbiased language.

A virtual assistant module 212 may be employed to conduct initial interviews with a candidate, including video interviews, which can be used to assess the candidate's communication skills and basic qualifications. The results of the initial interview with a candidate may be used to match the candidate with a particular hiring company. In embodiments, a candidate may proceed to an interview with a human only after the virtual assistant module 212 has determined that the candidate's skills and qualifications are a potential match with the hiring company providing the human interview.

A social media screening module 213 may integrate with publicly available social media data to retrieve and provide additional information regarding a candidate, further contributing to the body of knowledge and the candidate's score.

An unemployment agency linking module 214 may connect with unemployment agencies across different states. The unemployment agency linking module 214 can track a candidate's job search efforts and provide information to the relevant unemployment agency, allowing the relevant unemployment agency to immediately stop unemployment checks as soon as a candidate has been hired by a hiring entity. For example, the unemployment agency linking module 214 may establish a connection with a communication portal of an unemployment agency, e.g., via the AI-driven job recruitment system 225, and transmit employment data including, e.g., job search data indicating a job search status corresponding to a candidate, and/or an employment status corresponding to a candidate. As a result, unemployment checks performed by an unemployment agency may be immediately stopped upon a candidate being hired.

A recruitment management platform 207 included in the AI-driven job recruitment system 225 may serve as a common application to a plurality of participating hiring entities 220. The participating hiring entities 220 may pay a fee to access the recruitment management platform 207, and/or may pay a commission upon making a hire using the recruitment management platform 207. For example, participating hiring entities 220 and candidates 221 may interact with the AI-driven job recruitment system 225, including transmitting and receiving data and communications with the AI-driven job recruitment system 225, via the recruitment management platform 207.

The recruitment management platform 207 may utilize the machine learning model 200 to match a candidate with a hiring entity 220 among the participating hiring entities 220. For example, the recruitment management platform 207 may employ the machine learning model 200 to match a candidate 221 with a hiring entity 220 based on the analysis and score of the candidate's resume. The process of scoring a candidate's resume relative to a hiring entity 220 may be repeated for each participating hiring entity 220 until a hiring entity 220 is selected for that particular resume, in which case, the candidate 220 may be notified that a match with a hiring entity 220 has been determined.

Figure 3:
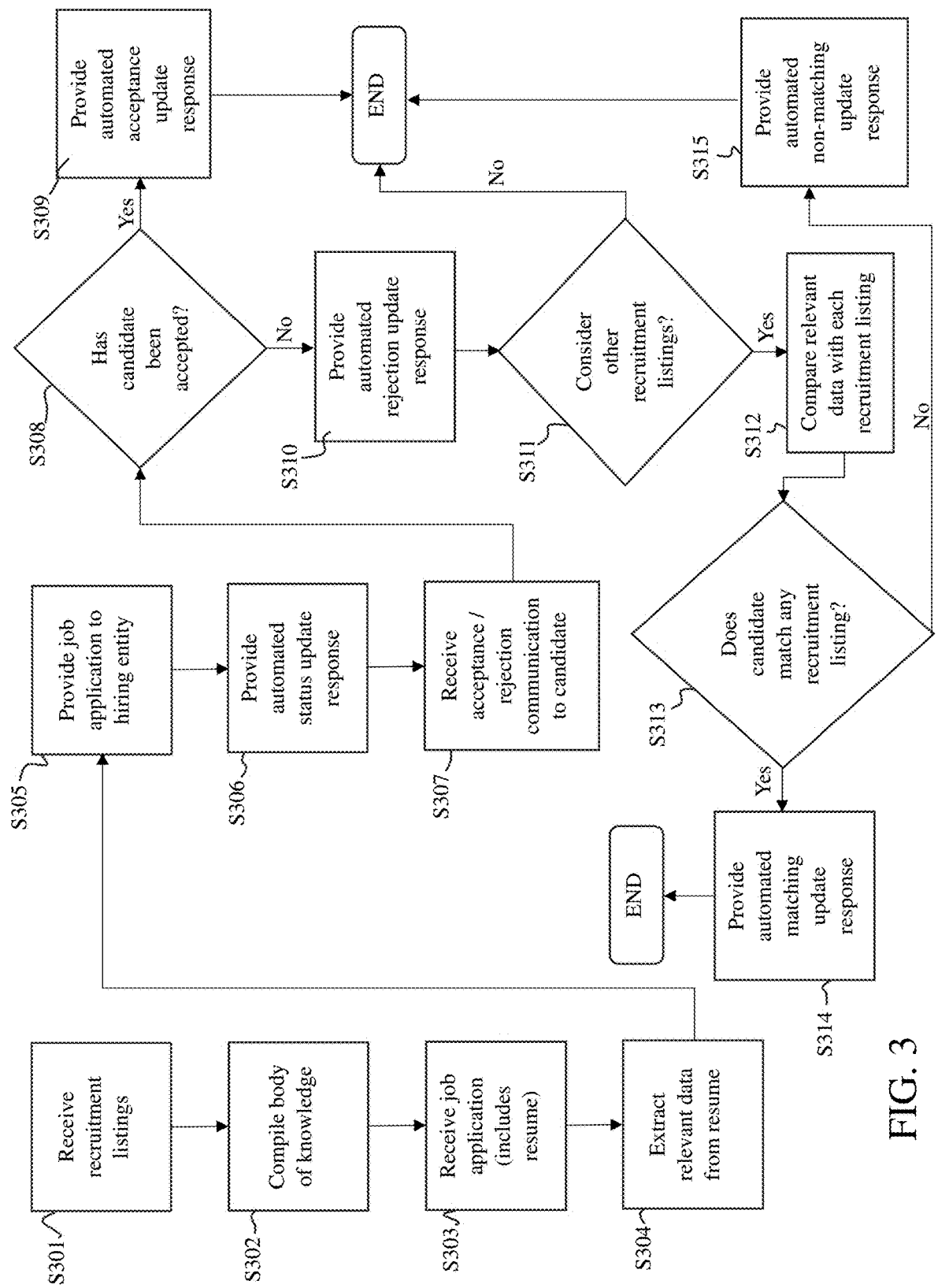
FIG. 3 is a flowchart illustrating a method of recruiting a candidate using the automated AI-driven job recruiting system according to aspects of the present disclosure.

FIG. 3 is a flowchart illustrating a computer-implemented method of recruiting a candidate using an automated AI-driven job recruiting system according to aspects of the present disclosure.

Referring particularly to FIG. 3, in operation S301, a plurality of recruitment listings may be received by the recruitment listing module 205. Each recruitment listing may include data indicative of job qualifications. For example, each recruitment listing may be a job listing provided by a hiring entity 220, setting forth the description of the available job, the requirements of the available job, etc.

Hiring entities 220 and candidates 221 may transmit and receive information to and from the machine learning model 200 via the recruitment management platform 207 of the AI-driven job recruitment system 225.

In operation S302, the body of knowledge may be compiled based on the received recruitment listings. For example, a robust body of knowledge indicating available jobs and their respective requirements may be created. The body of knowledge may then be referred to when resumes are received from candidates 221 in search of a job.

In operation S303, a job application may be received from a candidate 221 by the AI-driven resume screening module 202. For example, the candidate 221 may upload the job application to the AI-driven job recruitment system 225 via the job recruitment platform 207, and the AI-driven job recruitment system 225 may then transmit the job application to the AI-driven resume screening module 202. The job application may include a resume and a target recruitment listing among the plurality of recruitment listings. For example, when the candidate 221 is applying for a specific job being offered by a hiring entity 220 that is utilizing the automated AI-driven job recruitment system 225, the job application provided by the candidate 221 may specify which job he/she is applying to, e.g., via a target recruitment listing. The resume-screening module 202 may parse and separate the resume and the job application.

In operation S304, relevant data may be extracted from the resume by analyzing the resume. As described above, NLP and OCR may be employed to parse a resume to extract relevant keywords and data.

In operation S305, the job application is provided to the hiring entity 220 corresponding to the target recruitment listing. For example, if entity A provides a recruitment listing (e.g., a job listing) for job B, and the candidate's job application specifies job B as the target recruitment listing, the candidate's job application is provided to entity A. The job application may be transmitted to the hiring entity 220 via the job recruitment platform 207 of the AI-driven job recruitment system 225.

In operation S306, upon the job application being provided to the target hiring entity, the AI-driven job recruitment system 225 may provide the candidate 221 with an automated status update response generated by the response generation module 206, indicating to the candidate 221 that the candidate 221 is being considered for the target recruitment listing. As described above, the automated status update response may be, for example, a positive and empathetic response, which can serve as a morale booster for the candidate 221 as the candidate 221 awaits further information regarding the recruitment process. As described above, while the candidate 221 is waiting for a final decision, the automated status update response may be sent on a periodic basis, at a frequency selected by the candidate 221. The automated status update response may be personalized using information extracted from the candidate's resume.

In operation S307, an acceptance/rejection communication may be received by the job recruitment platform 207 of the AI-driven job recruitment system 225 from the target hiring entity 220 and transmitted from the job recruitment platform 207 of the AI-driven job recruitment system 225 to the candidate 221. The acceptance/rejection communication indicates to the candidate 221 whether the candidate 221 has been accepted or rejected for the target recruitment listing.

In operation S308, it is determined whether the acceptance/rejection communication indicates whether the candidate 221 has been accepted or rejected for the target recruitment listing.

When it is determined at operation S308 that the acceptance/rejection communication indicates that the candidate 221 has been accepted for the target recruitment listing, the recruitment management platform 207 of the AI-driven job recruitment system 225 provides the candidate 221 with an automated acceptance update response generated by the response generation module 206, indicating to the candidate 221 that the candidate 221 has been accepted for the target recruitment listing (operation S309). Alternatively, when it is determined at operation S308 that the acceptance/rejection communication indicates that the candidate 221 has been rejected for the target recruitment listing, the recruitment management platform 207 of the AI-driven job recruitment system 225 provides the candidate 221 with an automated rejection update response generated by the response generation module 206, indicating to the candidate 221 that the candidate 221 has been rejected for the target recruitment listing (operation S310).

Upon sending the automated rejection update response, indicating to the candidate 221 that the candidate 221 has been rejected for the target recruitment listing, a query is submitted to the candidate 221 in operation S311 inquiring whether the candidate wishes to be considered for other recruitment listings that the candidate 221 may be qualified for.

If the candidate 221 provides a response indicating that he/she does not wish to be considered for other job recruitment listings, the process may end.

Alternatively, if the candidate 221 provides a response indicating that the candidate does wish to be considered for other job recruitment listings, it may be determined whether the candidate is a match with another recruitment listing. For example, as described above, relevant data extracted from the candidate's resume may be compared and matched against information included in the recruitment listings in the body of knowledge other than the target recruitment listing (operation S312), and the scoring module 316 in communication with the AI-driven resume screening module 202 may calculate and assign a score for the resume for each recruitment listing. When the score is above a preset threshold, the candidate 221 may be flagged as being a potential target candidate 221 for that particular recruitment listing. Based on the comparison results, it may be determined whether the candidate 221 matches any recruitment listing other than the target recruitment listing (operation S313).

When it is determined in operation S313 that the candidate 221 is a match with a recruitment listing in the body of knowledge other than the target recruitment listing, the recruitment management platform 207 of the AI-driven job recruitment system 225 may provide the candidate 221 with a fourth response generated by the response generation module 206, including information related to the matching recruitment listing, in operation S314. For example, the fourth response may provide the candidate 221 with a description of the corresponding hiring entity 220, contact information of the corresponding hiring entity 220, a questionnaire prepared by the corresponding hiring entity 220, a description of the corresponding job, etc.

Alternatively, when it is determined in operation S312 that the candidate 221 is not a match with a recruitment listing in the body of knowledge other than the target recruitment listing, the recruitment management platform 207 of the AI-driven job recruitment system 225 may provide the candidate 221 with an automated non-matching update response, indicating to the candidate that a match was not found, in operation S315.

After the candidate 221 is provided with a response indicating that match with a recruitment listing has been determined, the candidate 221 may be contacted by the corresponding hiring entity 220 to continue the recruitment process. For example, the candidate 221 may be contacted by the corresponding hiring entity 220 to provide more information, schedule an interview, etc.

Figure 4:
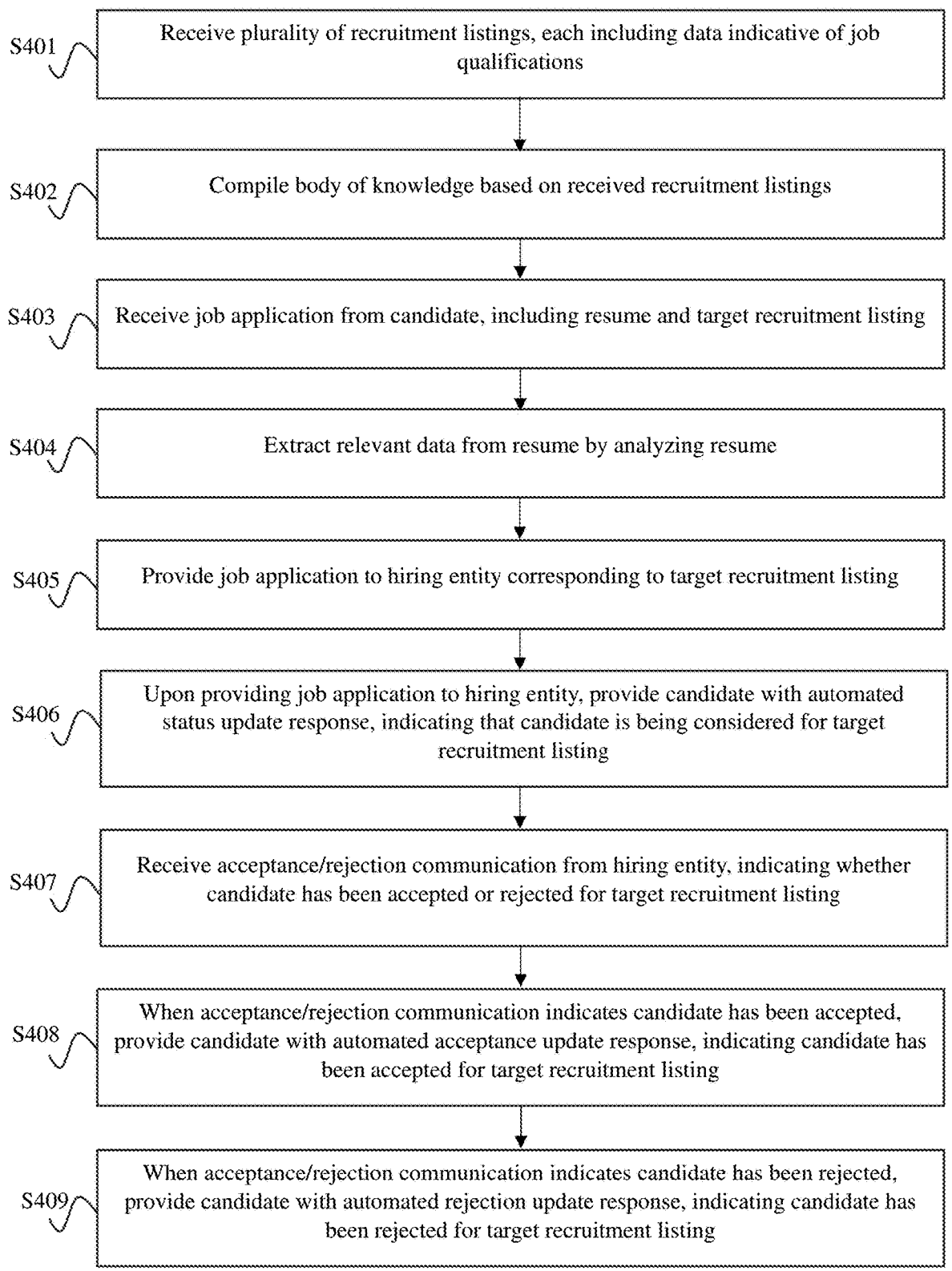
FIG. 4 is a flowchart illustrating a method of recruiting a candidate using the automated AI-driven job recruiting system according to aspects of the present disclosure.

FIG. 4 is a flowchart illustrating a computer-implemented method of recruiting a candidate using an automated AI-driven job recruiting system according to aspects of the present disclosure.

Referring particularly to FIG. 4, the computer-implemented method includes receiving a plurality of recruitment listings, in which each recruitment listing includes data indicative of job qualifications (operation S401). The method further includes compiling a body of knowledge based on the received recruitment listings (operation S402) and receiving a job application from a candidate (operation S403). The job application includes a resume and a target recruitment listing among the plurality of recruitment listings. The method further includes extracting relevant data from the resume by analyzing the resume (operation S404) and providing the job application to a hiring entity corresponding to the target recruitment listing (operation S405). Upon providing the job application to the hiring entity, providing the candidate with an automated status update response, the method further includes indicating to the candidate that the candidate is being considered for the target recruitment listing (operation S406). The method further includes receiving an acceptance/rejection communication from the hiring entity, indicating whether the candidate has been accepted or rejected for the target recruitment listing (operation S407). When the acceptance/rejection communication indicates that the candidate has been accepted for the target recruitment listing, the method further includes providing the candidate with an automated acceptance update response, indicating to the candidate that the candidate has been accepted for the target recruitment listing (operation S408). When the acceptance/rejection communication indicates that the candidate has been rejected for the target recruitment listing, the method further includes providing the candidate with an automated rejection update response, indicating to the candidate that the candidate has been rejected for the target recruitment listing (operation S409).

Figure 5:
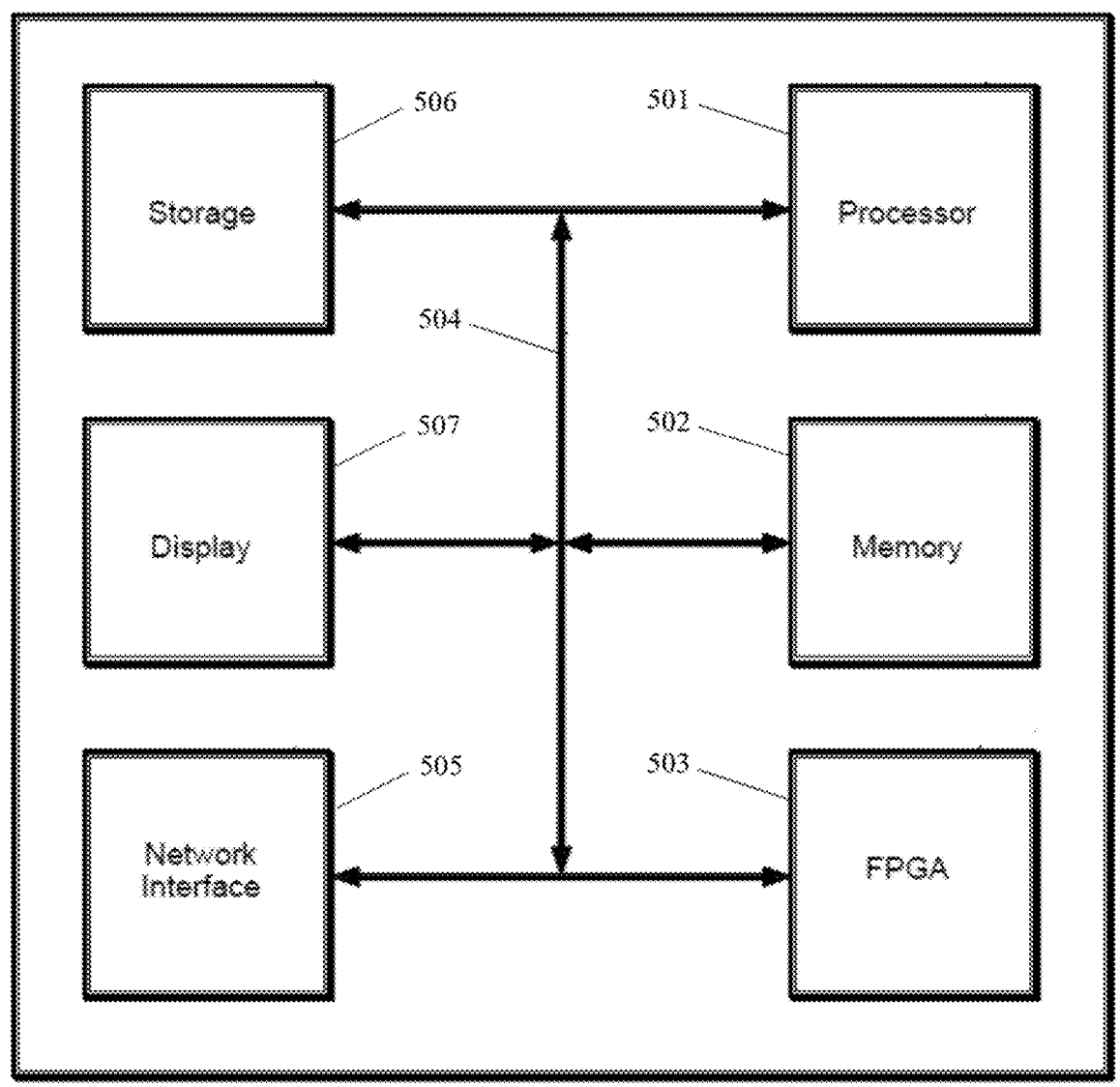
FIG. 5 is a block diagram of an exemplary computer for implementing the method of recruiting a candidate using the automated AI-driven job recruiting system according to aspects of the present disclosure.

Referring particularly to FIG. 5, a general-purpose computer 500 is described. The devices described herein (e.g., AI-driven job recruitment system 225 and/or the machine learning model 200 of FIG. 1) may have the same or substantially the same structure as the computer 500 or may incorporate at least some of the components of the computer 500. The general-purpose computer 500 can be employed to perform the various methods and algorithms described herein. The computer 500 may include a processor 501 connected to a computer-readable storage medium or a memory 502 which may be a volatile type memory, e.g., RAM, or a non-volatile type memory, e.g., flash media, disk media, etc. The processor 501 may be another type of processor such as, without limitation, a digital signal processor, a microprocessor, an ASIC, a graphics processing unit (GPU), field-programmable gate array (FPGA) 503, or a central processing unit (CPU).

In some aspects of the disclosure, the memory 502 can be random access memory, read-only memory, magnetic disk memory, solid state memory, optical disc memory, and/or another type of memory. The memory 502 can communicate with the processor 501 through communication buses 504 of a circuit board and/or through communication cables such as serial ATA cables or other types of cables. The memory 502 includes computer-readable instructions that are executable by the processor 501 to operate the computer 500 to execute the algorithms described herein. The computer 500 may include a network interface 505 to communicate (e.g., through a wired or wireless connection) with other computers or a server. A storage device 506 may be used for storing data. The computer may include one or more FPGAs 503. The FPGA 503 may be used for executing various machine learning algorithms. A display 507 may be employed to display data processed by the computer 500.

Generally, the memory 502 may store computer instructions executable by the processor 501 to carry out the various functions described herein.

The computer 500 may employ various artificial intelligence models, such as one or more machine learning models or algorithms.

Connections between the various modules, hardware, and other components described herein may be achieved through either wired or wireless connections, such as wireless connections through WiFi, BlueTooth, or other short range wireless communication protocols (e.g., radio frequencies).

Figure 6:
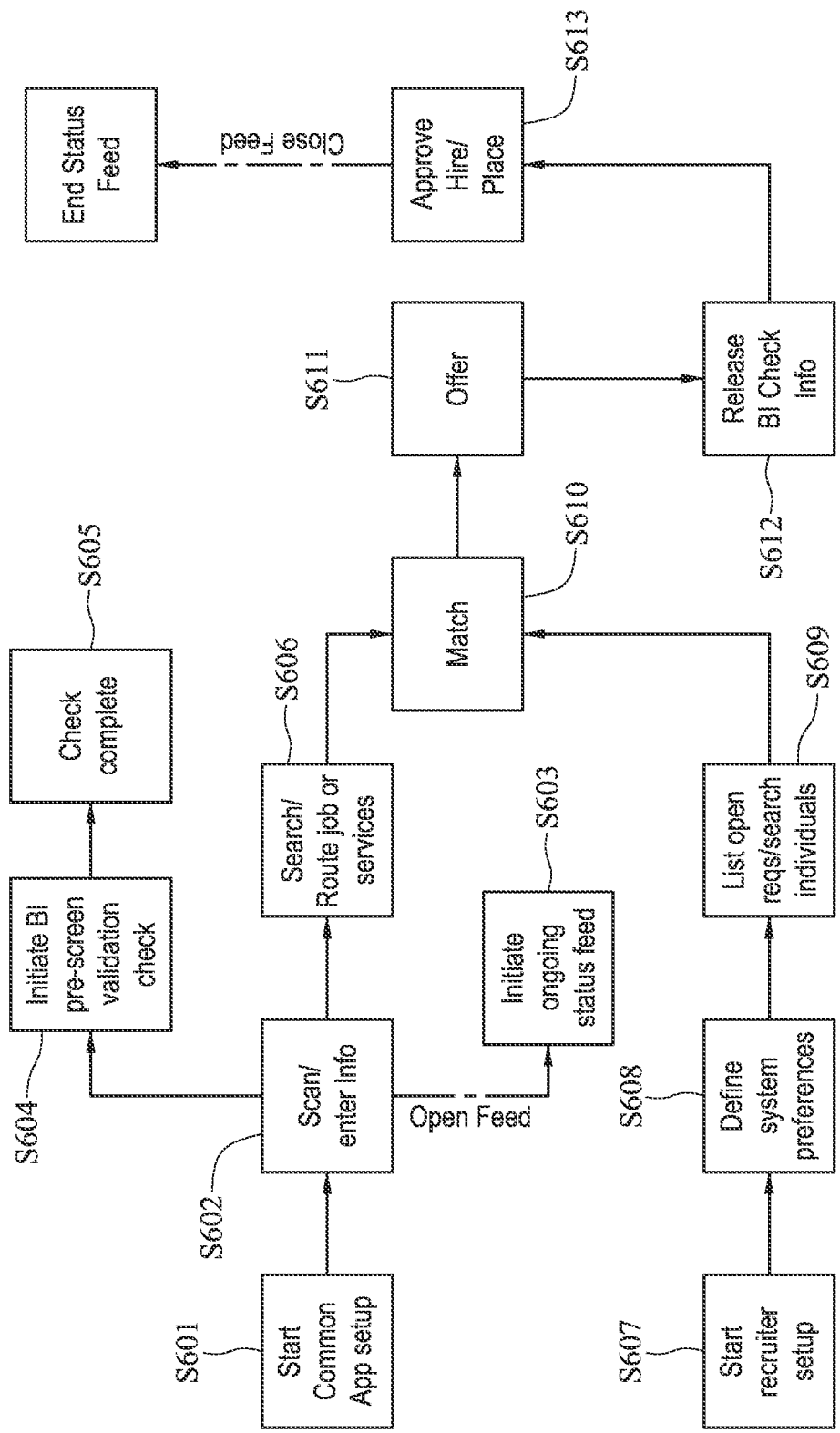
FIG. 6 is a flowchart illustrating a method of recruiting a candidate using the automated AI-driven job recruiting system according to aspects of the present disclosure.

FIG. 6 is a flowchart illustrating a method of recruiting a candidate using the automated AI-driven job recruiting system according to aspects of the present disclosure.

Referring particularly to FIG. 6, in operation S601 a common application setup is started. The common application provides information for an applicant that is suitable for job placement, apartment/house/vacation rental, dating applications, pet sitting positions, pet adoption, volunteer positions, coaching positions, childcare positions, elder care positions, tutoring positions, academic positions, and the like. The common application provides a user with a pre-populated set of information that can be easily transmitted, as described herein in more detail to rapidly facilitate an application process, such as an application for a job. For example, contact information, employment history, licenses, academic credentials, references, writing or publication samples, etc. may all be included in the common application.

Referring to operation S602, information may be manually entered and/or scanned. Scanning may be performed using optical character recognition, such as optical character recognition assisted by a convolutional neural network, as described herein. In operation S603, an ongoing status feed update is initiated to dynamically update the common application. For example, if an applicant obtains a new certificate, credential, or license, the common application may be automatically updated.

In operation S604 a background check is conducted. When the background check is completed at operation S605 the background check can be incorporated in the common application. As an example, the common application may be digitally deliverable file that includes a link or a separately accessible computer file including the results of the background check. Thus, the common application and/or in-hand background check are made readily available to a user to deliver virtually instantaneously, as the need arises, such as when applying for a job.

In operation S606, an applicant can search for a job or service, such as by searching publicly or privately accessible job or service postings. The jobs or services being searched may have been populated at operations S607-S609.

A recruiter may start a job or service listing posting at operation S607, which may include defining posting or listing preferences at operation S608. The recruiter may also have the option to conduct a search for a potential applicant at operation 609. Alternatively, or in addition to an applicant searching for an employer/recruiter, or an employer/recruiter searching for an applicant, the system may also identify a match between a qualified candidate and a corresponding job listing at operation S610.

An offer may be made to an applicant at operation S611. The offer may be made directly by a recruiter/employer, or the system may extend the offer with approval of the recruiter/employer at operation S611.

The applicant may agree to release the background check at operation S612 to the employer/recruiter (e.g., in real-time) and an employer/recruiter may then decide to approve a hiring or placement of an applicant at operation S613.

The common application may work in conjunction with an embedded background check. That is, an applicant generating a common application can also opt to have a background check conducted preemptively, and the results of the background check can be stored and provided in embedded format with the common application. Thus, the common application and/or background check can be made readily available for dissemination by a user to rapidly maneuver through an employment process that might take a considerable amount of time under conventional circumstances. For example, a decision to hire someone or approve an applicant for any of the positions or arrangements (e.g., property rentals) described herein may be completed substantially instantaneously, such as in real-time.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the present disclosure. Further, the blocks, units and/or modules of the embodiments may be physically combined into more complex blocks, units and/or modules without departing from the scope of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "unit" or "system." Furthermore, aspects of the present disclosure may take the form of a computer program product embodied in one or more computer readable medium(s) having computer readable program code embodied thereon. If implemented in software, the functions may be stored on or transmitted over as one or more instructions or code on a tangible, non-transitory computer-readable medium.

Herein, the term "circuit" may refer to an analog circuit or a digital circuit. In the case of a digital circuit, the digital circuit may be hard-wired to perform the corresponding tasks of the circuit, such as a digital processor that executes instructions to perform the corresponding tasks of the circuit. Examples of such a processor include an application-specific integrated circuit (ASIC) and a field-programmable gate array (FPGA).

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A system of performing automated job recruitment, comprising:
a memory storing a machine learning model; and
a processor configured to execute the machine learning model, wherein the machine learning model is configured to:
initiate a common application configured to provide background information regarding a candidate;
identify a plurality of disparate types of background information for use in the common application;
incorporate the disparate types of background information into the common application;
dynamically update the common application in response to a change in a qualification of the candidate;
conduct a background check of the candidate based on the background information;
incorporate the background check into the common application, wherein the background check is incorporated into the common application in an embedded format with the common application;
providing access to the common application including the incorporated background check to a plurality of hiring entities having access to the common application;
receive a plurality of recruitment listings, wherein each recruitment listing includes data indicative of job qualifications;
compile a body of knowledge based on the received recruitment listings, wherein the body of knowledge includes information acquired from a plurality of disparate sources;
receive a job application from the candidate,
wherein the job application includes a resume and a target recruitment listing among the plurality of recruitment listings,
wherein the target recruitment listing indicates a specific job the candidate is applying to;
extract relevant data from the resume by analyzing the resume;
provide the job application of the candidate to a hiring entity, among the plurality of hiring entities, corresponding to the target recruitment listing prior to comparing the extracted relevant data from the resume with each recruitment listing in the body of knowledge other than the target recruitment listing;

upon providing the job application to the hiring entity corresponding to the target recruitment listing, provide the candidate with an automated status update response, indicating to the candidate that the candidate is being considered for the target recruitment listing, prior to comparing the extracted relevant data from the resume with each recruitment listing in the body of knowledge other than the target recruitment listing;

receive an acceptance/rejection communication from the hiring entity corresponding to the target recruitment listing, indicating whether the candidate has been accepted or rejected for the target recruitment listing;

when the acceptance/rejection communication indicates that the candidate has been accepted for the target recruitment listing:

provide the candidate with an automated acceptance update response, indicating to the candidate that the candidate has been accepted for the target recruitment listing;

provide the candidate with a request for approval to release the background check, in real-time, to the hiring entity corresponding to the target recruitment listing;

provide the hiring entity corresponding to the target recruitment listing, in real-time and via the common application, a digitally deliverable file including a link or a separately accessible computer file including the background check; and when the acceptance/rejection communication indicates that the candidate has been rejected for the target recruitment listing:

provide the candidate with an automated rejection update response, indicating to the candidate that the candidate has been rejected for the target recruitment listing; and compare the extracted relevant data from the resume with each recruitment listing in the body of knowledge other than the target recruitment listing, wherein the memory stores computer instructions configured to instruct the processor to:

initially train the machine learning model on at least one first data set to dynamically update the common application with updated skills acquired by the candidate; and iteratively retrain the machine learning model on at least one second and at least one third data set to dynamically update the common application with additional updated skills acquired by the candidate, wherein iteratively retraining the machine learning model increases the accuracy of the machine learning model in identifying additional updated skills acquired by the candidate with respect to the initial training of the machine learning model, wherein when the acceptance/rejection communication indicates that the candidate has been rejected for the target recruitment listing, the machine learning model is further configured to:

determine whether the candidate is a match with any one of the recruitment listings in the body of knowledge other than the target recruitment listing;

when it is determined that the candidate is a match with any one of the recruitment listings in the body of knowledge other than the target recruitment listing, provide the candidate with an automated matching update response, including information related to the matching recruitment listing; and when it is determined that the candidate is not a match with any one of the recruitment listings in the body of knowledge other than the target recruitment listing, provide the candidate with an automated non-matching update response, indicating to the candidate that a match was not found.

2. The system of claim 1, wherein the automated non-matching update response includes career coaching information.

3. The system of claim 2, wherein the career coaching information includes a matrix template mapping skills of the user included in the relevant data extracted from the resume with qualifications for a bridge job.

4. The system of claim 1, wherein the automated status update response is a personalized empathetic response generated based on the extracted relevant data.

5. The system of claim 4, wherein the automated status update response is personalized based on a birthdate of the user.

6. The system of claim 1, wherein the automated status update response is one of a plurality of automated status update responses, and the user chooses the frequency of receiving the plurality of automated status update responses.

7. The system of claim 1, wherein the machine learning model is further configured to:

establish a connection with a communication portal of an unemployment agency; and transmit employment data corresponding to the candidate to the unemployment agency.

8. The system of claim 7, wherein the employment data includes job search data indicating a job search status corresponding to the candidate.

9. The system of claim 7, wherein the employment data includes an employment status corresponding to the candidate.

10. A computer-implemented method of performing automated job recruitment, comprising:

initiating a common application configured to provide background information regarding a candidate;

identifying a plurality of disparate types of background information for use in the common application;

incorporating the disparate types of background information into the common application;

dynamically updating the common application in response to a change in a qualification of the candidate;

conducting a background check of the candidate based on the background information;

incorporating the background check into the common application, wherein the background check is incorporated into the common application in an embedded format with the common application;

providing access to the common application including the incorporated background check to a plurality of hiring entities having access to the common application;

receiving a plurality of recruitment listings, wherein each recruitment listing includes data indicative of job qualifications;

compiling a body of knowledge based on the received recruitment listings, wherein the body of knowledge includes information acquired from a plurality of disparate sources;

receiving a job application from the candidate, wherein the job application includes a resume and a target recruitment listing among the plurality of recruitment listings, wherein the target recruitment listing indicates a specific job the candidate is applying to;

extracting relevant data from the resume by analyzing the resume;

providing the job application of the candidate to a hiring entity, among the plurality of hiring entities, corresponding to the target recruitment listing prior to comparing the extracted relevant data from the resume with each recruitment listing in the body of knowledge other than the target recruitment listing;

upon providing the job application to the hiring entity corresponding to the target recruitment listing, providing the candidate with an automated status update response, indicating to the candidate that the candidate is being considered for the target recruitment listing, prior to comparing the extracted relevant data from the resume with each recruitment listing in the body of knowledge other than the target recruitment listing;

receiving an acceptance/rejection communication from the hiring entity corresponding to the target recruitment listing, indicating whether the candidate has been accepted or rejected for the target recruitment listing;

when the acceptance/rejection communication indicates that the candidate has been accepted for the target recruitment listing:

providing the candidate with an automated acceptance update response, indicating to the candidate that the candidate has been accepted for the target recruitment listing;

providing the candidate with a request for approval to release the background check, in real-time, to the hiring entity corresponding to the target recruitment listing;

providing the hiring entity corresponding to the target recruitment listing, in real-time and via the common application, a digitally deliverable file including a link or a separately accessible computer file including the background check; and when the acceptance/rejection communication indicates that the candidate has been rejected for the target recruitment listing:

providing the candidate with an automated rejection update response, indicating to the candidate that the candidate has been rejected for the target recruitment listing; and comparing the extracted relevant data from the resume with each recruitment listing in the body of knowledge other than the target recruitment listing;

initially training a machine learning model on at least one first data set to dynamically update the common application with updated skills acquired by the candidate; and iteratively retraining the machine learning model on at least one second and at least one third data set to dynamically update the common application with additional updated skills acquired by the candidate, wherein iteratively retraining the machine learning model increases the accuracy of the machine learning model in identifying additional updated skills acquired by the candidate with respect to the initial training of the machine learning model, wherein when the acceptance/rejection communication indicates that the candidate has been rejected for the target recruitment listing, the machine learning model is further configured to:

determine whether the candidate is a match with any one of the recruitment listings in the body of knowledge other than the target recruitment listing;

when it is determined that the candidate is a match with any one of the recruitment listings in the body of knowledge other than the target recruitment listing, provide the candidate with an automated matching update response, including information related to the matching recruitment listing; and when it is determined that the candidate is not a match with any one of the recruitment listings in the body of knowledge other than the target recruitment listing, provide the candidate with an automated non-matching update response, indicating to the candidate that a match was not found.

11. The method of claim 10, wherein the automated non-matching update response includes career coaching information.

12. The method of claim 11, wherein the career coaching information includes a matrix template mapping skills of the user included in the relevant data extracted from the resume with qualifications for a bridge job.

13. The method of claim 10, wherein the automated status update response is a personalized empathetic response generated based on the extracted relevant data.

14. The method of claim 13, wherein the automated status update response is personalized based on a birthdate of the user.

15. The method of claim 10, wherein the automated status update response is one of a plurality of automated status update responses, and the user chooses the frequency of receiving the plurality of automated status update responses.

16. The method of claim 10, wherein the machine learning model is further configured to:
establish a connection with a communication portal of an unemployment agency; and
transmit employment data corresponding to the candidate to the unemployment agency.

17. The method of claim 16, wherein the employment data includes job search data indicating a job search status corresponding to the candidate.

18. The method of claim 16, wherein the employment data includes an employment status corresponding to the candidate.

* * * * *